United States Patent
Murai et al.

(10) Patent No.: US 11,848,460 B2
(45) Date of Patent: Dec. 19, 2023

(54) BATTERY FOR VEHICLE AND VEHICLE

(71) Applicant: HONDA MOTOR CO., LTD., Tokyo (JP)

(72) Inventors: Ryuichi Murai, Guangzhou (CN); Ke Wang, Guangzhou (CN)

(73) Assignee: HONDA MOTOR CO., LTD., Tokyo (JP)

(*) Notice: Subject to any disclaimer, the term of this patent is extended or adjusted under 35 U.S.C. 154(b) by 73 days.

(21) Appl. No.: 17/562,119

(22) Filed: Dec. 27, 2021

(65) Prior Publication Data
US 2022/0209357 A1     Jun. 30, 2022

(30) Foreign Application Priority Data
Dec. 28, 2020  (CN) .......................... 202011576854.6

(51) Int. Cl.
*H01M 10/613*    (2014.01)
*H01M 10/625*    (2014.01)
(Continued)

(52) U.S. Cl.
CPC ....... *H01M 50/289* (2021.01); *H01M 10/613* (2015.04); *H01M 10/625* (2015.04);
(Continued)

(58) Field of Classification Search
CPC ............. H01M 50/289; H01M 10/613; H01M 10/625; H01M 10/6554; H01M 10/6556;
(Continued)

(56) References Cited

U.S. PATENT DOCUMENTS

2017/0313170 A1   11/2017  Hara et al.
2020/0070671 A1   3/2020   Ohkuma
(Continued)

FOREIGN PATENT DOCUMENTS

CN       209001088 U    6/2019
JP       07-052660      2/1995
(Continued)

OTHER PUBLICATIONS

Japanese Office Action for Japanese Patent Application No. 2021-212631 dated Feb. 21, 2023.

*Primary Examiner* — Stewart A Fraser
(74) *Attorney, Agent, or Firm* — AMIN, TUROCY & WATSON, LLP (57) ABSTRACT

A battery for a vehicle includes a battery case; and a battery module disposed therein, wherein the battery case includes a side wall and a bottom wall, the battery module is disposed on the bottom wall and apart away from the side wall, a force transmission assembly including a fixation member fixed and connected to the side wall and a transmission member fixed and connected to the fixation member is provided between the battery module and the side wall, a distance between the transmission member and the battery module is smaller than a distance between the fixation member and the battery module, and when a collision occurs to the side wall, the transmission member is displaced toward the battery module accompanied with a deformation of the side wall due to the collision so as to transmit a collision force to the battery module.

10 Claims, 3 Drawing Sheets

(51) Int. Cl.
 *H01M 10/6556* (2014.01)
 *H01M 50/202* (2021.01)
 *H01M 50/249* (2021.01)
 *H01M 10/6554* (2014.01)
 *H01M 50/289* (2021.01)

(52) U.S. Cl.
 CPC ... *H01M 10/6554* (2015.04); *H01M 10/6556* (2015.04); *H01M 50/202* (2021.01); *H01M 50/249* (2021.01); *H01M 2200/00* (2013.01); *H01M 2220/20* (2013.01)

(58) Field of Classification Search
 CPC ............. H01M 50/202; H01M 50/249; H01M 2200/00; H01M 2220/20; H01M 50/204; H01M 50/242; H01M 50/291
 See application file for complete search history.

(56) References Cited

U.S. PATENT DOCUMENTS

2020/0365959 A1 11/2020 Yamagishi et al.
2022/0320659 A1* 10/2022 Munjurulimana .. H01M 50/249

FOREIGN PATENT DOCUMENTS

| JP | 10-006785 | 1/1998 |
| JP | 2017-197047 | 11/2017 |
| JP | 2020-026220 | 2/2020 |
| JP | 2020-035554 | 3/2020 |
| JP | 2020-066317 | 4/2020 |
| JP | 2020-187966 | 11/2020 |
| JP | 2020-196432 | 12/2020 |

* cited by examiner

BATTERY FOR VEHICLE AND VEHICLE

CROSS-REFERENCE TO RELATED APPLICATION

The priority is claimed based on a Chinese Patent Application No. 202011576854.6, filed on Dec. 28, 2020. The content of the Chinese Patent Application is incorporated herein by reference.

TECHNICAL FIELD

The present disclosure relates to a technical field of an electric vehicle. More specifically, the present disclosure relates to a battery for a vehicle and a vehicle.

BACKGROUND ART

An electric vehicle is a vehicle with a power battery as the driving power and running by driving the wheels by a motor while meeting various requirements of road traffic and safety regulations. Accordingly, it is important to keep the stability and the safety of the battery attached to the electric vehicle.

Currently, the power battery attached to the electric vehicle has a plurality of battery modules and the connections of the internal electric circuits are very applicated. It is necessary to provide a cooling system therein since the battery module generates a relatively large amount of heat during the driving. For example, the liquid cooling system for a battery module disclosed in Patent Document 1 includes a battery case, a cooling liquid circulation sub system, and a battery module. Both the liquid input pipeline assembly and the quick connection plug of the cooling liquid circulation sub system are positioned between the battery module and the side wall of the battery case. Other important members for making the battery function normally, such as the connection cables or the like are provided in the space between the battery module and the side wall of the battery case. When the collision occurs with respect to the power battery, the side wall of the battery case is tilted and deformed so as to be concave toward the battery module side. During the process when the side wall of the battery case is tilted to be concave, the liquid input pipeline assembly, the quick connection plug, and other connection cables positioned between the battery module and the side wall of the battery case are pressed during the collision such that it is possible to lead to the disconnection of the cables and the broken of the liquid input pipeline, and ultimately, it is impossible to properly provide the power to the battery and major safety issues will probably occur.

CITATION LIST

Patent Document

[Patent Document 1] Chinese Utility Model Publication No. 209001088

SUMMARY

The present disclosure is made in consideration of the above circumstances, and an object of the present disclosure is to provide a battery for a vehicle and a vehicle for solving the problem that the battery case transmits the collision force to the module positioned between the battery case and the battery module when the collision occurs to the battery case. However, the object of the present disclosure is not limited thereto.

The present disclosure provides a battery for a vehicle including a battery case; and a battery module disposed in the battery case. The battery case includes a side wall, and a bottom wall connected to a lower end portion of the side wall. The battery module is disposed on the bottom wall and apart away from the side wall. A force transmission assembly including a transmission member and a fixation member is provided between the battery module and the side wall. The transmission member is fixed and connected to the fixation member, the fixation member is fixed and connected to the side wall, and a distance between the transmission member and the battery module is smaller than a distance between the fixation member and the battery module. When a collision occurs to the side wall, the transmission member is displaced toward the battery module accompanied with a deformation of the side wall due to the collision so as to transmit a collision force to the battery module.

The force transmission assembly is fixed to the battery case by the fixation member such that it is not necessary to change the structure of the battery case and the battery case is easy to be configured. When the side wall of the battery case receives the collision, the side wall is tilted and deformed to be concave in the direction toward the battery module such that the transmission member can displace in the direction toward the battery module. Generally, the transmitted collision force is smaller than the force that the battery module can withstand such that it is possible to avoid the situation in which the side wall applies the collision force directly on the members such as the water-cooling pipeline and the connection member while preventing the side wall from causing damage to the battery module. Accordingly, the transmission member transmits the collision force to the battery module so as to reduce the possibility that the other members positioned between the battery module and the side wall due to the deformation of the side wall while preventing the side wall from being excessively tilted to improve the effects of protecting the battery for a vehicle from the collision.

An outside surface of the transmission member may be in close contact with the side wall.

According to such a configuration, it is possible to improve the effect of the transmission member transmitting the collision force and effect of the transmission member supporting the side wall of the battery case such that it is possible to improve the effect of preventing the side wall from being tilted.

Furthermore, a lower side wall of the fixation member may be in close contact with the bottom wall.

According to such a configuration, when the side wall is tilted to be concave, both the fixation member and the bottom wall support the side wall so as to improve the effect of preventing the side wall from being tilted.

Furthermore, the fixation member may be fixed and connected to an end of the transmission member that is close to the side wall.

According to such a configuration, the strength of the end portion of the transmission member close to the side wall of the battery case is improved. When the side wall is tilted to be concave, the collision is firstly transmitted to this end portion of the transmission member such that the end portion having a higher strength is suitable for preventing the side wall from being excessively tilted.

A water-cooling pipeline may be disposed between the battery module and the side wall, wherein the water-cooling pipeline may be superimposed with the transmission member in a vertical direction and disposed to be apart away from the transmission member, and a distance between the water-cooling pipeline and the side wall may be larger than a distance between the transmission member and the battery module.

The water-cooling pipeline is disposed in the vertical direction and the distance between the water-cooling pipeline and the side wall is larger than the distance between the transmission member and the battery module such that when the side wall receives the collision and is tilted to be concave, the collision force is transmitted to the battery module by the transmission member before the collision force is transmitted to the water-cooling pipeline. The water-cooling pipeline is disposed to be apart away from the transmission member such that when the transmission member is deformed toward the battery module, it is possible to prevent part of the collision force from being transmitted to the water-cooling pipeline. According to the above-described configuration, it is impossible for the side wall of the battery case to press the water-cooling pipeline and it is possible to protect the water-cooling pipeline and prevent the water-cooling pipeline from receiving the collision force and being damaged.

A water-cooling plate may be provided between the bottom wall and the battery module, wherein the water-cooling plate may communicate with a connection member via the water-cooling pipeline, the force transmission assembly and the connection member may be disposed to be apart away from each other, and a distance between the connection member and the side wall may be larger than a distance between the transmission member and the battery module.

The connection member is configured to communicate the water-cooling pipeline and the water-cooling plate and when the collision occurs, it is necessary to protect the connection member from being broken. By providing the force transmission assembly in the vicinity of the connection member and disposing the force transmission member to be apart from the connection member by a predetermined interval such that the collision force received in the vicinity of the connection member may be transmitted to the battery module and the connection member may be protected. The distance between the connection member and the side wall is determined for transmitting the collision force to the battery module at first before the side wall collides with the connection member when the side wall is tilted. According to the above-described configuration, it is impossible for the side wall of the battery case to press the connection member such that it is possible to protect the connection member to prevent the connection member from being broken by receiving the collision force and prevent the coolant from being leaked.

The connection member may be positioned between two adjacent force transmission assemblies.

In this manner, the two sides of the connection member are protected by the force transmission assembly and the protection with respect to the connection member is enhanced.

In another example, a first extension portion extending upwardly may be formed in a first end of the transmission member that is close to the side wall, a second extension portion extending upwardly may be formed in a second end of the transmission member that is close to the battery module, and when the transmission member transmits a collision force to the battery module, an outside surface of the first extension portion may be in close contact with the side wall, and an outside surface of the second extension portion may be in close contact with the battery module.

The first extension portion and the second extension portion are configured to effectively enlarge the contact area between the first end of the transmission member and the side wall and between the second end of the transmission member and the battery module such that the collision force is dispersed over a wider area and the collision force is more suitably transmitted to the battery module.

Furthermore, each of the first extension portion and the second extension portion may have a cross section in a triangle shape in a direction orthogonal to the side wall.

Enlarging the contact area between the transmission member and the side wall or the battery module is beneficial for the transmission of the force; however, it is necessary to ensure that the collision to the battery module by the transmission member is not excessively large. Otherwise, if the damage occurs in the battery module, it is possible for some serious failure such as grounding or the short circuit to occur in the whole battery for a vehicle. According to the shape of the cross section described above, it is possible to enlarge the contact area while preventing the strength of the first extension portion and the second extension portion from being excessively large. Even in a case in which the collision force is relatively large, the first extension portion and the second extension portion can deform such that it is possible to prevent the collision load with respect to the battery module from being excessively large to protect other member from the collision while protecting the battery module.

Furthermore, the fixation member may have a hollow structure.

According to the configuration, when the transmission member and the fixation member is assembled, it is unnecessary to occupy extra space other than the predetermined attachment space so as to make the assembly and the disassembly of the transmission member and the fixation member to be easier.

Another example of the present disclosure provides a vehicle including the above-described battery for a vehicle. According to the vehicle, the same effects may be achieved with those of the battery for a vehicle according to the above-described aspects.

ADVANTAGEOUS EFFECTS OF INVENTION

According to the battery for a vehicle and the vehicle described in the above-described aspects, the force transmission assembly is provided between the battery module and the side wall of the battery case, the force transmission assembly is configured from the transmission member and the fixation member, and the transmission member is fixed and connected to the side wall by the fixation member. When the side wall receives the collision, it is possible to avoid the situation in which the transmission member directly transmits the collision force to the members such as the water-cooling pipeline and the connection or the like by the transmission member transmitting the collision force to the battery module. Accordingly, when the collision is received, it is possible to prevent the battery case from transmitting the collision force to the members between the battery case and the battery module while preventing the side wall from being excessively tilted so as to effectively improve the effects of the collision protection with respect to the battery for a vehicle.

DESCRIPTION OF EMBODIMENTS

In order to make the technical problem, the solutions and the effects of the present application clearer, hereinafter, embodiments of the present application will be described with reference to the figures. Hereinafter, the following embodiments are only used to describe the present application and are not used to limit the present application. Also, the configurations shown in figures are only specific examples of the present application and the person with ordinary skill in the art can achieve other figures based on the enclosed figures of the present application.

It should be understood that when a member is "fixed to", "disposed on", or "connected to" another member, this member may directly communicate with other members, or indirectly communicate with other members. In the following description, it is noted that the locations and positional relationships indicated by the terms "length", "width", "upper", "lower", "front", "rear", "left", and "right" should be understood with reference to the enclosed figures and such terms are used to make the description to be simple. Such terms are not used to indicate or implicit the apparatus and the element thereof have the particular directions and positions, to be configured and operated in the particular directions and at the specific positions, such that the present disclosure is not limited by these terms. For a person with ordinary skill in the art, the specific meaning of the above-mentioned terms may be suitably understood according to the actual situation. The terms "first", "second", and "third" are only used for making the description easy to understand, and they are not used to indicate or implicit the importance of the configurations or implicit the amount of the technical features. Unless otherwise defined, the term "a plurality of" means that an amount equal to two or more than two.

First Embodiment

Referring to FIG. 1 to FIG. 4, in the present embodiment, a battery for a vehicle 1 is provided. The battery for a vehicle 1 includes a battery case 10 and a battery module 20. The battery case 10 includes a bottom wall 11 and a side wall 12, and the bottom wall 11 is connected to a lower end portion of the side wall 12. The battery module 20 is disposed inside the battery case 10. The battery module 20 is disposed on the bottom wall 11, and the battery module 20 is disposed to be apart away from the side wall 12 by an interval. A force transmission assembly 30 is provided between the battery module 20 and the side wall 12. The force transmission assembly 30 includes a transmission member 31 and a fixation member 32, and the transmission member 31 is connected to the fixation member 32 in a fixed state. The fixation member 32 is fixed and connected to the side wall 12, and a distance between the transmission member 31 and the battery module 20 is smaller than a distance between the fixation member and the battery module 20. When the side wall 12 receives the collision, the transmission member 31 displaces toward the battery module 20 accompanied by the collision deformation of the side wall 12 so as to transmit the collision force to the battery module 20.

More specifically, the battery module 20 includes a battery main body 21 and a module case 22. A plurality of battery main bodies 21 are accommodated in the module case 22. The module case 22 has a predetermined rigidity and strength, and the module case 22 is configured to support the battery main body 21 and protect the battery main body 21 from the collision. The fixation member 32 may be directly welded to the inside surface of the side wall 12 via an outside surface 322 of the fixation member 32. Accordingly, it is possible to fix and connect the fixation member 32 to the battery case 10 without changing the structure of the battery case 10. With regard to the fixation member 32, the fixation method thereof is not limited to the welding method, and other fixation method can be adopted. The transmission member 31 and the fixation member 32 can be attached to each other and detached from each other by a matching with a bolt and a nut such that the transmission member 31 can be individually detached and exchanged. According to such a connection method, there is no interfere with the attachment of other members, and the occupied space is relatively small. The fixation method of the transmission member 31 and the fixation member 32 is not limited to the fixation method by the bolt and the nut, and other fixation method can be adopted. When an accident occurs to the vehicle and the side wall 12 receives the collision, the side wall 12 is tilted and deformed in the direction toward the battery module 20 and the transmission member 31 and the fixation member 32 moves toward the battery module 20. The distance between the inside surface 311 of the transmission member 31 and the module case 22 is smaller than the distance between the inside surface 321 of the fixation member 32 and the module case 22 such that the transmission member 31 comes in contact with the module case 22 earlier than the fixation member 32 and the collision force generated during the collision is transmitted to the module case 22. It is not only possible to keep an enough interval between the battery module 20 and the side wall 12 so as to reduce the damage occurred due to the collision by the side wall 12 with respect to the members between the battery case 10 and the module case 22, but also beneficial to prevent the side wall 12 from being excessively tilted and beneficial to repair the battery case 10 afterwards.

Figure 1:
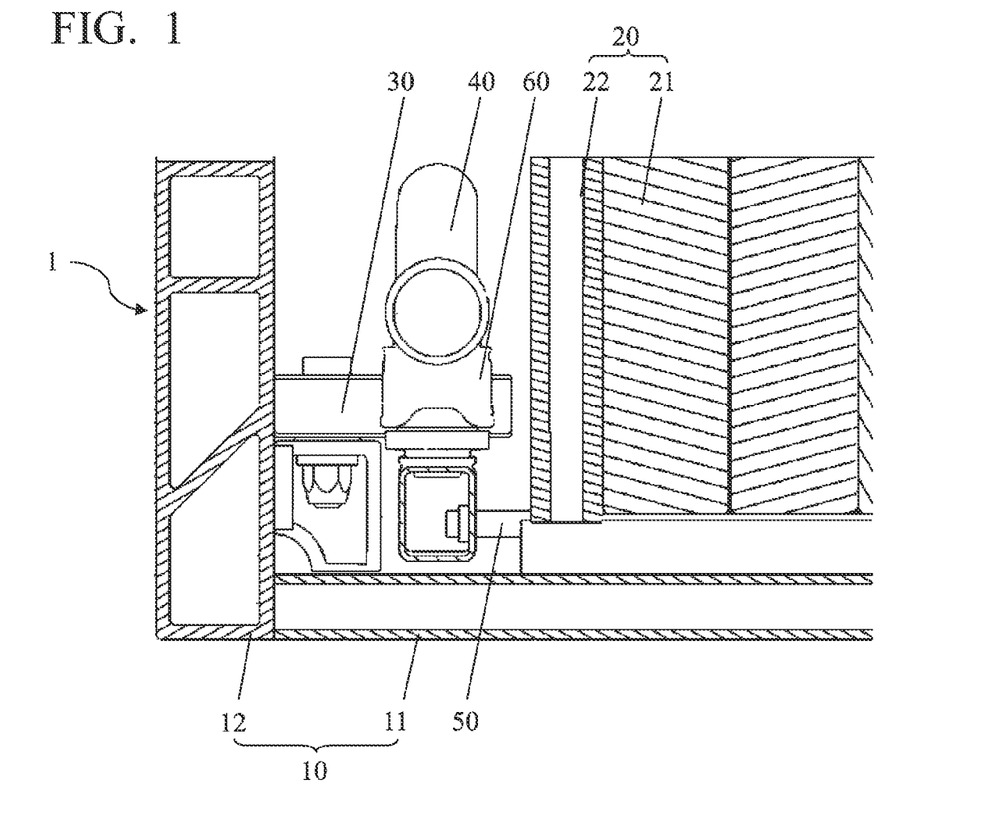
FIG. 1 is a schematic view showing a partial vertical cross section of a battery for a vehicle according to a first embodiment of the present disclosure.
Figure 2:
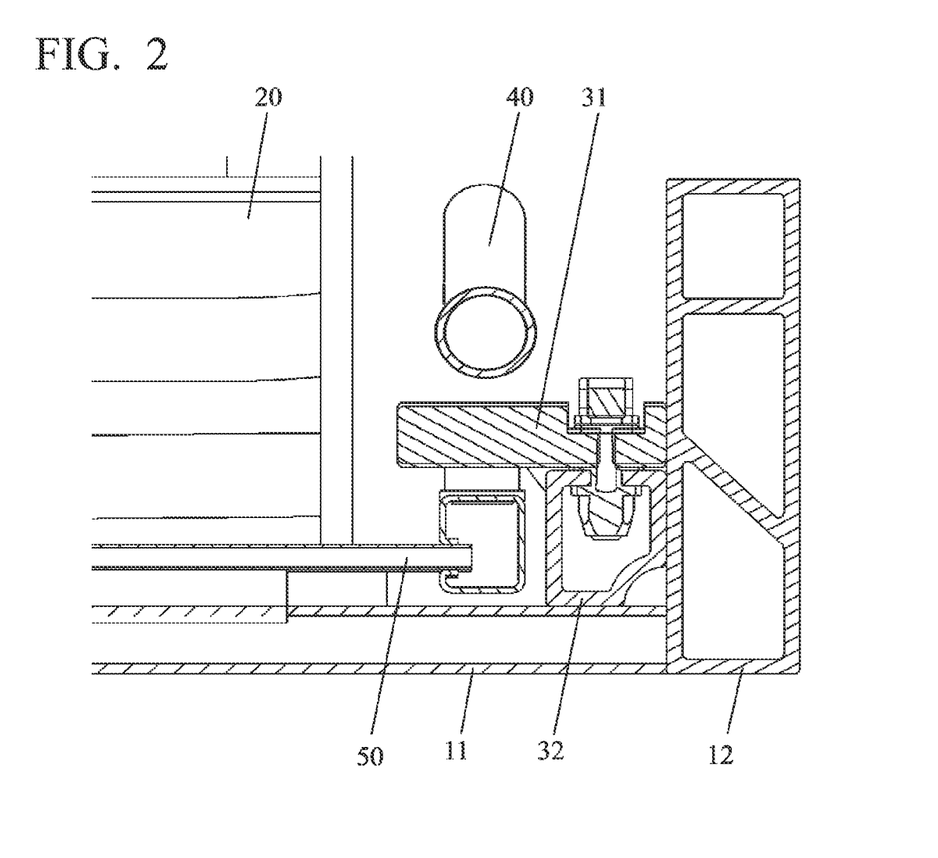
FIG. 2 is a schematic view showing the partial vertical cross section of the battery for a vehicle from another angle according to the first embodiment of the present disclosure.
Figure 4:
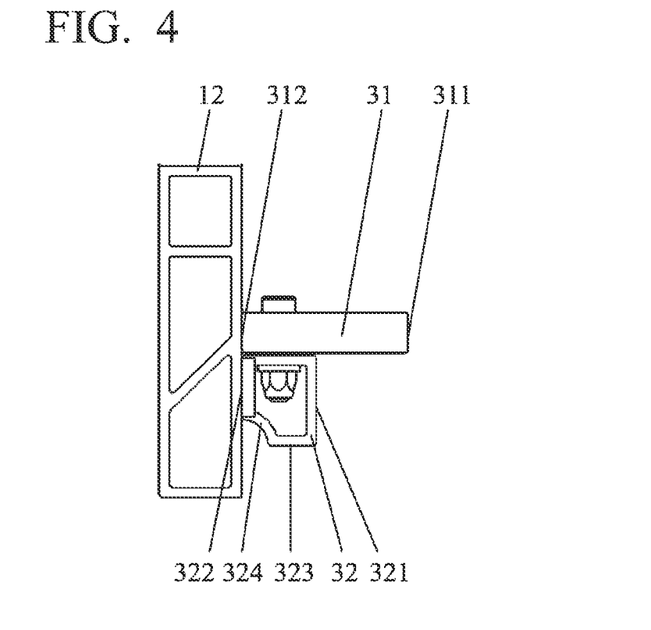
FIG. 4 is a schematic view showing the partial vertical cross section of the battery for a vehicle according to the first embodiment of the present disclosure.

Furthermore, referring to FIG. 1, FIG. 2, and FIG. 4, in the present embodiment, the outside surface 312 of the transmission member 31 is in close contact with the side wall 12 of the battery case 10. In other words, the outside surface 312 of the transmission member 31 is in close contact with the inside surface of the side wall 12. According to this configuration, when the side wall 12 receives the collision, it is possible to improve the transmission effect of the collision force by the transmission member 31 and the support effect of the transmission member 31 with respect to the side wall 12 so as to more suitably prevent the side wall 12 from being tilted.

Referring to FIG. 1, FIG. 2, and FIG. 4, in the present embodiment, the lower surface 323 of the fixation member 32 is in close contact with the inside surface of the bottom wall 11. According to this configuration, when the side wall 12 of the battery case 10 is tilted to be concave, the fixation member 32 together with the bottom wall 11 support the side wall 12 so as to more suitably prevent the side wall 12 from being tilted.

Furthermore, referring to FIG. 4, in the present embodiment, the fixation member 32 is fixed and connected to an end of the transmission member 31 that is close to the side wall 12 of the battery case 10. More specifically, the transmission member 31 is positioned at the upper side, the lower side, the left side, or the right side of the fixation member 32, and the end portion of the transmission member 31 close to the side wall 12 is fixed and connected to the upper surface, the lower surface, the left surface, or the right surface of the fixation member 32 via the matching with the bolt and the nut. When the transmission member 31 is positioned at the upper side of the fixation member 32, the lower surface of the transmission member 31 is in close contact with the upper surface of the fixation member 32, when the transmission member 31 is positioned at the left side of the fixation member 32, the right surface of the transmission member 31 is in close contact with the left surface of the fixation member 32, and when the transmission member 31 is positioned at the right side of the fixation member 32, the left surface of the transmission member 31 is in close contact with the right surface of the fixation member 32. According to the configuration, the strength of the end of the transmission member 31 close to the side wall 12 becomes higher. When the side wall 12 is tilted to be concave, the impact is transmitted to this end portion at first such that the end portion having a higher strength can more suitably absorb the collision force to suitably prevent the side wall 12 from being tilted.

Referring to FIG. 4, in the present embodiment, the fixation member 32 has a hollow structure. More specifically, the fixation member 32 is configured by a top wall, an outside wall, an inside wall, and a bottom wall surrounding a space. A second mounting hole is formed on the top wall of the fixation member 32. At the same time, a first mounting hole is formed on the end portion of the transmission member 31 close to the side wall 12 of the battery case 10. At the time of assembling the transmission member 31 and the fixation member 32, the thread end part of the bolt passes through the first mounting hole and the second mounting hole sequentially and then connected to the nut screw provided in the inside hole of the fixation member to make the transmission member 31 and the fixation member 32 to be fixed and connected to each other. Accordingly, it is unnecessary to occupy a further mounting space for adding the nut and the inside hole of the fixation member 32 can be utilized as the space for inserting a wrench or the like such that the assembly and the disassembly of the transmission member 31 and the fixation member 32 becomes easy.

Referring to FIG. 4, in the present embodiment, a chamfer 324 is formed in a corner portion at the lower end portion of the fixation member 32 that is close to the side wall 12 of the battery case 10. More specifically, the chamfer 324 is formed in a transition portion connecting the inside wall and the bottom wall of the fixation member 32. The chamfer 324 is configured to avoid the assembly disposed to be in close contact with the inside surface of the side wall 12 so as to sufficiently utilize the space between the battery module 20 and the side wall 12 to make the structure of the battery for a vehicle 1 to be compact.

Furthermore, referring to FIG. 1 and FIG. 2, in the present embodiment, a water-cooling pipeline 40 is provided between the battery module 20 and the side wall 12 of the battery case 10. The water-cooling pipeline 40 is disposed to be superimposed with the transmission member 31 in the vertical direction, and apart away from the transmission member 31 at an interval. The distance between the water-cooling pipeline 40 and the side wall 12 is larger than the distance between the transmission member 31 and the battery module 20. More specifically, the water-cooling pipeline 40 is disposed in the interval between the battery module 20 and the side wall 12 of the battery case 10, and at the upper side or the lower side of the transmission member 31. The distance from the water-cooling pipeline 40 to the side wall 12 is larger than the distance from the transmission member 31 to the battery module 20. The configuration that the water-cooling pipeline 40 and the transmission member 31 are disposed in the vertical direction and the distance from the water-cooling pipeline 40 to the side wall 12 is larger than the distance from the transmission member 31 to the battery module 20 is made to transmit the collision force to the battery module 20 via the transmission member 31 before the water-cooling pipeline 40 receives the collision when the side wall 12 is tilted to be concave after receiving the collision. At the same time, the water-cooling pipeline 40 and the transmission member 31 are disposed to be apart away from each other so as to prevent part of the collision force from being transmitted to the water-cooling pipeline 40 when the transmission member 31 displaces toward the battery module 20. According to the above-described configuration, since the side wall 12 does not press the water-cooling pipe 40, it is possible to protect the water-cooling pipeline 40 and prevent the water-cooling pipeline 40 from being damaged by the collision force.

Furthermore, referring to FIG. 1 and FIG. 2, in the present embodiment, a water-cooling plate 50 is provided between the bottom wall 11 of the battery case 10 and the battery module 20. The water-cooling plate 50 and the water-cooling pipeline 40 are communicated with each other via a connection member 60. The force transmission assembly 30 is disposed to be apart away from the connection member 60 by an interval. The distance between the connection member 60 and the side wall 12 of the battery case 10 is larger than the distance between the transmission member 31 and the battery module 20. More specifically, the connection member 60 is disposed in the interval between the battery module 20 and the side wall 12 of the battery case 10, and the connection member 60 is disposed to be apart away from the whole force transmission assembly 30 by a predetermined distance. The distance between the connection member 60 and the side wall 12 is larger than the distance between the transmission member 31 and the battery module 20. The connection member 60 communicates the water-cooling pipeline 40 and the water-cooling plat 50 such that it is necessary to protect the connection member 60 and prevent the connection member 60 from being broken when the collision occurs. Here, by disposing the force transmission assembly 30 in the vicinity of the connection member 60 and to be apart from the connection member 60 by the predetermined interval, it is possible to protect the connection member 60. Setting the distance from the connection member 60 to the side wall 12 is for firstly transmitting the collision force to the battery module 20 before the side wall 12 and the connection member 60 collide with each other when the side wall 12 is tilted. According to the above-described configuration, there is not a situation in which the side wall 12 presses the connection member 60 such that it is possible to protect the connection member 60 and prevent the connection member 60 from being damaged by the collision force and prevent the coolant from being leaked.

Figure 3:
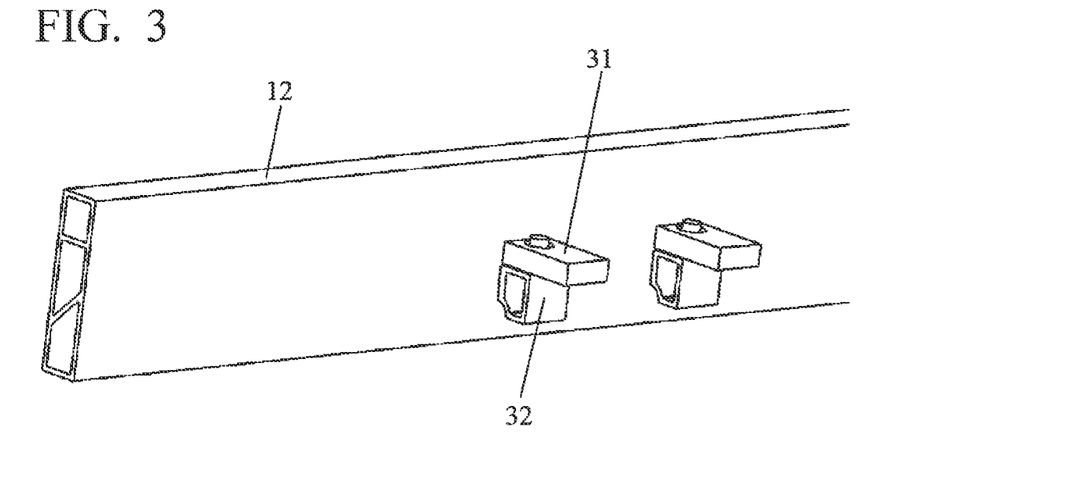
FIG. 3 is a three-dimensional schematic view showing a force transmission assembly according to the first embodiment of the present disclosure.

Furthermore, referring to FIG. 1 to FIG. 3, in the present embodiment, the connection member 60 is disposed between two of the adjacent force transmission assemblies 30. More specifically, the battery for a vehicle 1 includes a plurality of force transmission assemblies 30. The plurality of force transmission assemblies 30 are disposed between the battery module 20 and the side wall 12 of the battery case 10, and the plurality of force transmission assemblies 30 are disposed along the length direction of the side wall 12 and apart away from each other with the interval between two adjacent force transmission assemblies 30. The connection member 60 is disposed between the two adjacent force transmission assemblies 30 such that both the two sides of the connection member 60 are protected by the force transmission assemblies 30 to enhance the protection effect with respect to the connection member 60.

According to the present embodiment, the battery for a vehicle 1 includes the battery case 10 and the battery module 20. The battery case 10 includes the bottom wall 11 and the side wall 12, the bottom wall 11 is connected to the lower end portion of the side wall 12, and the battery module 20 is disposed inside the battery case 10. More specifically, the battery module 20 is disposed on the bottom wall 11, and the battery module 20 is disposed to be apart away from the side wall 12 by an interval. The force transmission assembly 30 is provided between the battery module 20 and the side wall 12. The force transmission assembly 30 includes the transmission member 31 and the fixation member 32. The fixation member has the hollow structure. The transmission member 31 is fixed and connected to the fixation member 32 by the bolt and the nut. The transmission member 31 and the fixation member 32 are disposed in the vertical up-down direction, and the fixation member 32 is welded with the side wall 12. Furthermore, the outside surface of the transmission member 31 is in close contact with the side wall 12, and the lower surface 323 of the fixation member 32 is in close contact with the bottom wall 11. The fixation member 32 is fixed and connected to the end of the transmission member 31 that is close to the side wall 12. The distance between the transmission member 31 and the battery module 20 is smaller than the distance between the fixation member 32 and the battery module 20. Meanwhile, the water-cooling pipeline 40 is disposed between the battery module 20 and the side wall 12 of the battery case 10. The water-cooling pipeline 40 is disposed to be superimposed with the transmission member 31 in the vertical direction, and apart away from the transmission member 31 at an interval. The distance between the water-cooling pipeline 40 and the side wall 12 is larger than the distance between the transmission member 31 and the battery module 20. Also, the water-cooling plate 50 is provided between the bottom wall 11 of the battery case 10 and the battery module 20. The water-cooling plate 50 and the water-cooling pipeline 40 communicate with each other by the connection member 60. The force transmission assembly 30 is disposed to be apart from the connection member 60 by the interval. The distance between the connection member 60 and the side wall 12 is larger than the distance between the transmission member 31 and the battery module 20. The connection member 60 is disposed between two of the adjacent force transmission assemblies 30. When the side wall 12 receives the collision, the transmission member 31 displaces toward the battery module 20 accompanied with the deformation of the side wall 12 due to the collision so as to transmit the collision force to the battery module 20.

According to the battery for a vehicle 1 in the present embodiment, the force transmission assembly 30 is disposed between the battery module 20 and the side wall 12 of the battery case 10. The force transmission assembly 30 includes the transmission member 31 and the fixation member 32, and the transmission member 31 is fixed and connected to the side wall 12 by the fixation member 32. According to the configuration, when the side wall 12 receives the collision, the transmission member 31 transmits the collision force to the battery module 20 so as to avoid the situation in which the side wall 12 directly applies the collision force to the members such as the water-cooling pipeline 40 and the connection member 60 or the like and solve the problem that during the collision, the battery case transmits the collision force to the assembly provided between the battery case and the battery module. Accordingly, it is possible to suitably prevent the side wall 12 from being excessively tilted and effectively improve the collision protection effect with respect to the battery for a vehicle 1.

Second Embodiment

Figure 5:
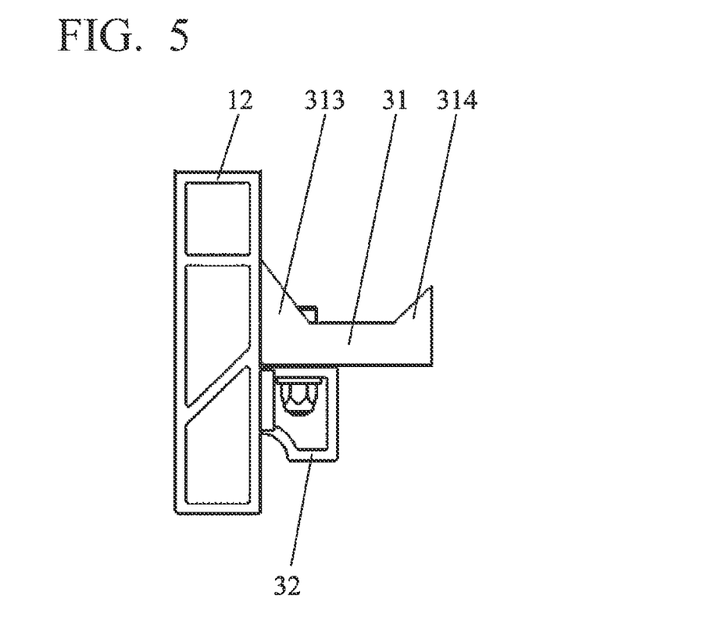
FIG. 5 is a schematic view showing a partial vertical cross section of a battery for a vehicle according to a second embodiment of the present disclosure.

Referring to FIG. 1, FIG. 2, and FIG. 5, the battery for a vehicle according to the present embodiment includes substantially the same configuration with that of the first embodiment. The battery for a vehicle according to the present embodiment is different from the battery for a vehicle according to the first embodiment in the following points. That is, a first extension portion 313 extending upwardly is formed in a first end of the transmission member 31 that is close to the side wall 12 of the battery case 10, and a second extension portion 314 extending upwardly is formed in a second end of the transmission member 31 that is close to the battery module 20. When the transmission member 31 transmits the collision force to the battery module 20, the outside surface of the first extension portion 313 is in close contact with the side wall 12, and the outside surface of the second extension portion 312 is in close contact with the batter module 20. More specifically, the first extension portion 313 is formed by extending upwardly from the upper surface of the first end of the transmission member 31 that is closed to the side wall 12, and the outside surface of the first extension portion 313 is on the same plane with the outside surface 312 of the transmission member 31. The second extension portion 314 is formed by extending upwardly from the upper surface of the second end of the transmission member 31 that is closed to the battery module 20, and the outside surface of the second extension portion 314 is on the same plane with the inside surface 311 of the transmission member 31. According to the configuration, the contact area of the first end in the transmission member 31 and the side wall 12, and the contact area of the second end in the transmission member 31 and the battery module 20 are effectively increased. Accordingly, it is possible to disperse the collision force to a larger area, and it is beneficial to transmit the collision force to the battery module 20 and reduce the collision load by the collision force on one point of the battery module 20.

Furthermore, referring to FIG. 5, in the present embodiment, each of the first extension portion 313 and the second extension portion 314 has the cross section, that is taken in the direction orthogonal to the side wall 12 of the battery case, in a triangle shape. In order to suitably transmit the collision force, it is necessary to ensure that the collision load to the transmission member 31 and the battery module 20 is not excessively large while increasing the contact area between the transmission member 31 and the side wall 12 or the battery module 20. If it is impossible to ensure that the transmitted collision force does not exceed the load that the battery module 20 can withstand, it is possible to cause the battery module 20 to be damaged and the whole battery for a vehicle 1 cannot operate normally. By setting the shape of the cross section in the triangle shape, it is possible to increase the contact area between the transmission member 31 and the side wall 12 or the battery module 20 while preventing the strength of the first extension portion 313 and the second extension portion 314 from being excessively large. When the collision force is relatively large, the first extension portion 313 and the second extension portion 314 are deformed to prevent the collision load with respect to the battery module 20 from being excessively large so as to protect other member from the impact while protecting the battery module 20.

Furthermore, referring to FIG. 5, in the present embodiment, a height by which the first extension portion 313 extends upwardly is larger than a height by which the second extension portion 314 extends upwardly. According to the present configuration, when the transmission member 31 transmits the collision force to the battery module 20, the contact area of the transmission member 31 and the side wall 12 is larger than the contact area of the transmission member 31 and the battery module 20 so as to suitably transmit the collision force from the side wall 12 to the transmission member 31 while preventing the impact with respect to the battery module 20 from being excessively large.

Third Embodiment

Referring to FIG. 1, in the present embodiment, a vehicle including the battery for a vehicle 1 is provided. Here, the battery for a vehicle 1 has the same configuration with that of the battery for a vehicle according to the first embodiment and the second embodiment, and the description of the configuration of the battery for a vehicle 1 is omitted.

The vehicle according to the present embodiment includes the battery for a vehicle 1, wherein the force transmission assembly 30 is disposed between the battery module 20 and the side wall 12 of the battery case 10, the force transmission assembly 30 includes the transmission member 31 and the fixation member 32, and the transmission member 31 is fixed and connected to the side wall 12 by the fixation member 32. According to the configuration, when the side wall 12 receives the collision, the transmission member 31 transmits the collision force to the battery module 20 so as to avoid the situation in which the side wall 12 directly transmits the collision force to the members such as the water-cooling pipeline 40 and the connection member 60 and solve the problem that the battery case transmits the collision force to the assembly between the battery case and the battery module during the collision. Accordingly, it is possible to effectively enhance the collision protection effect of the battery for a vehicle 1 and improve the safety performance of the vehicle.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST 1 battery for a vehicle
10 battery case
20 battery module
30 force transmission assembly
40 liquid cooling pipeline
50 water-cooling plate
60 connection member
11 bottom wall
12 side wall
21 battery main body
22 module case
31 transmission member
32 fixation member
311 inside surface of transmission member
312 outer surface of transmission member
313 first extension portion
314 second extension portion
321 inside surface of fixation member
322 outside surface of fixation member
322 lower surface of fixation member
324 chamfer

What is claimed is:

1. A battery for a vehicle, comprising:
a battery case; and
a battery module disposed in the battery case,
wherein the battery case includes a side wall, and a bottom wall connected to a lower end portion of the side wall,
the battery module is disposed on the bottom wall and apart away from the side wall,
a force transmission assembly including a transmission member and a fixation member is provided between the battery module and the side wall,
the transmission member is fixed and connected to the fixation member,
the fixation member is fixed and connected to the side wall,
a distance between the transmission member and the battery module is smaller than a distance between the fixation member and the battery module,
when a collision occurs to the side wall, the transmission member is displaced toward the battery module accompanied with a deformation of the side wall due to the collision so as to transmit a collision force to the battery module,
the battery for the vehicle comprises a water-cooling pipeline disposed between the battery module and the side wall,
the water-cooling pipeline is superimposed with the transmission member in a vertical direction and disposed to be apart away from the transmission member, and
a distance between the water-cooling pipeline and the side wall is larger than the distance between the transmission member and the battery module.

2. The battery for a vehicle according to claim 1, wherein an outside surface of the transmission member is in close contact with the side wall.

3. The battery for a vehicle according to claim 1, wherein a lower side wall of the fixation member is in close contact with the bottom wall.

4. The battery for a vehicle according to claim 1, wherein the fixation member is fixed and connected to an end of the transmission member that is close to the side wall.

5. The battery for a vehicle according to claim 1, further comprises a water-cooling plate between the bottom wall and the battery module,
wherein the water-cooling plate communicates with a connection member via the water-cooling pipeline,
the force transmission assembly and the connection member are disposed to be apart away from each other, and a distance between the connection member and the side wall is larger than the distance between the transmission member and the battery module.

6. The battery for a vehicle according to claim 5, wherein the connection member is positioned between two adjacent force transmission assemblies.

7. The battery for a vehicle according to claim 1,
wherein a first extension portion extending upwardly is formed in a first end of the transmission member that is close to the side wall,
a second extension portion extending upwardly is formed in a second end of the transmission member that is close to the battery module, and
when the transmission member transmits a collision force to the battery module, an outside surface of the first extension portion is in close contact with the side wall, and an outside surface of the second extension portion is in close contact with the battery module.

8. The battery for a vehicle according to claim 7, wherein each of the first extension portion and the second extension portion has a cross section in a triangle shape in a direction orthogonal to the side wall.

9. The battery for a vehicle according to claim 1, wherein the fixation member has a hollow structure.

10. A vehicle, comprising the battery for a vehicle according to claim 1.

* * * * *